Patented Apr. 3, 1934

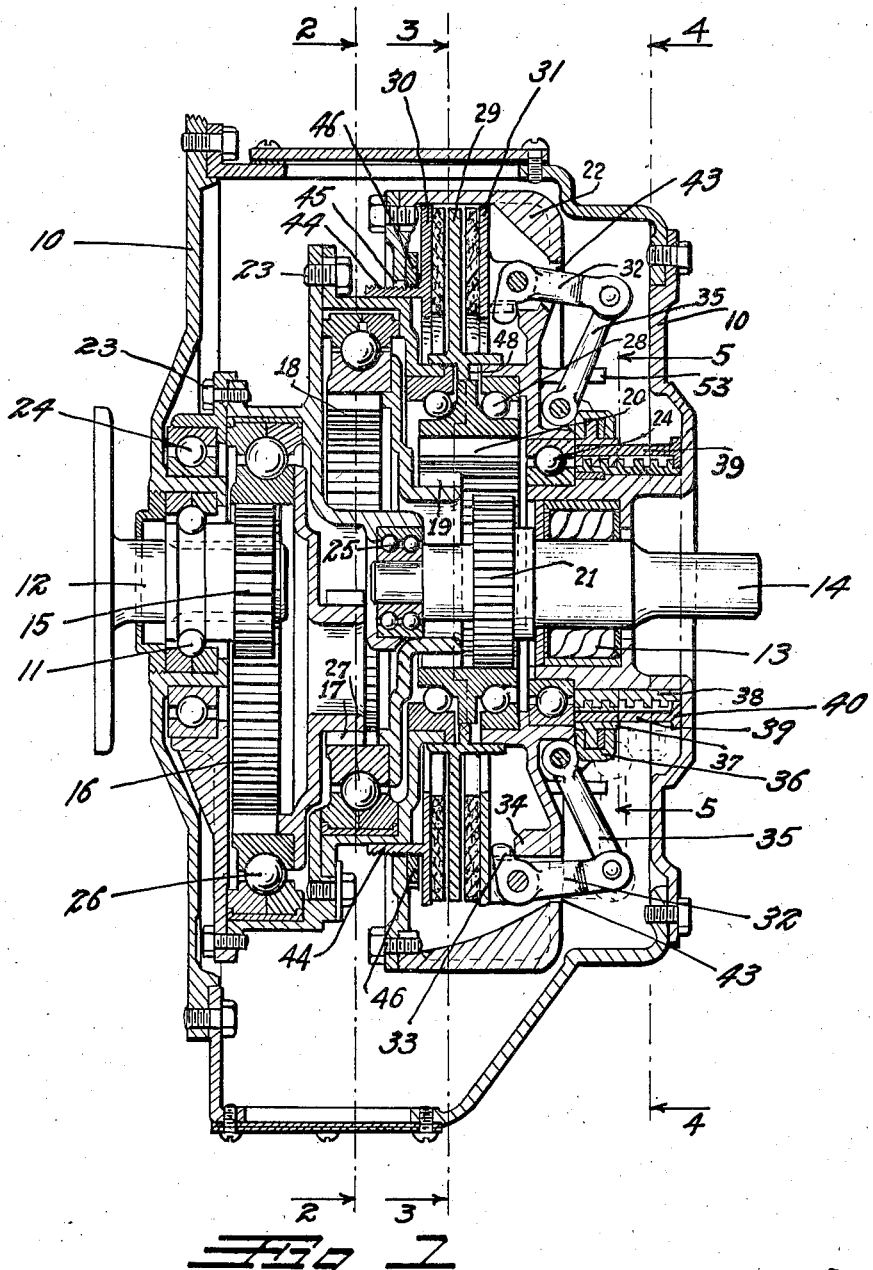

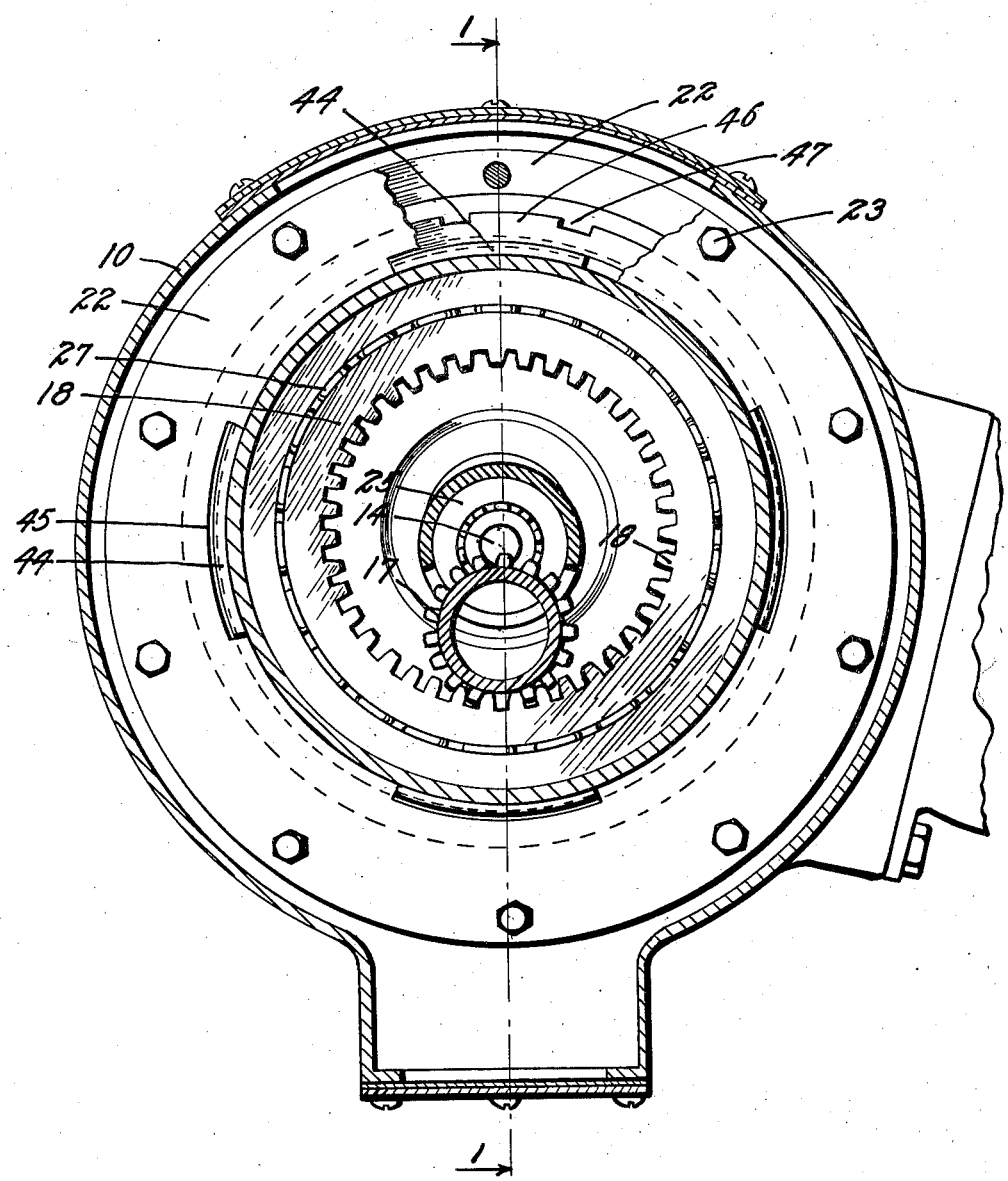

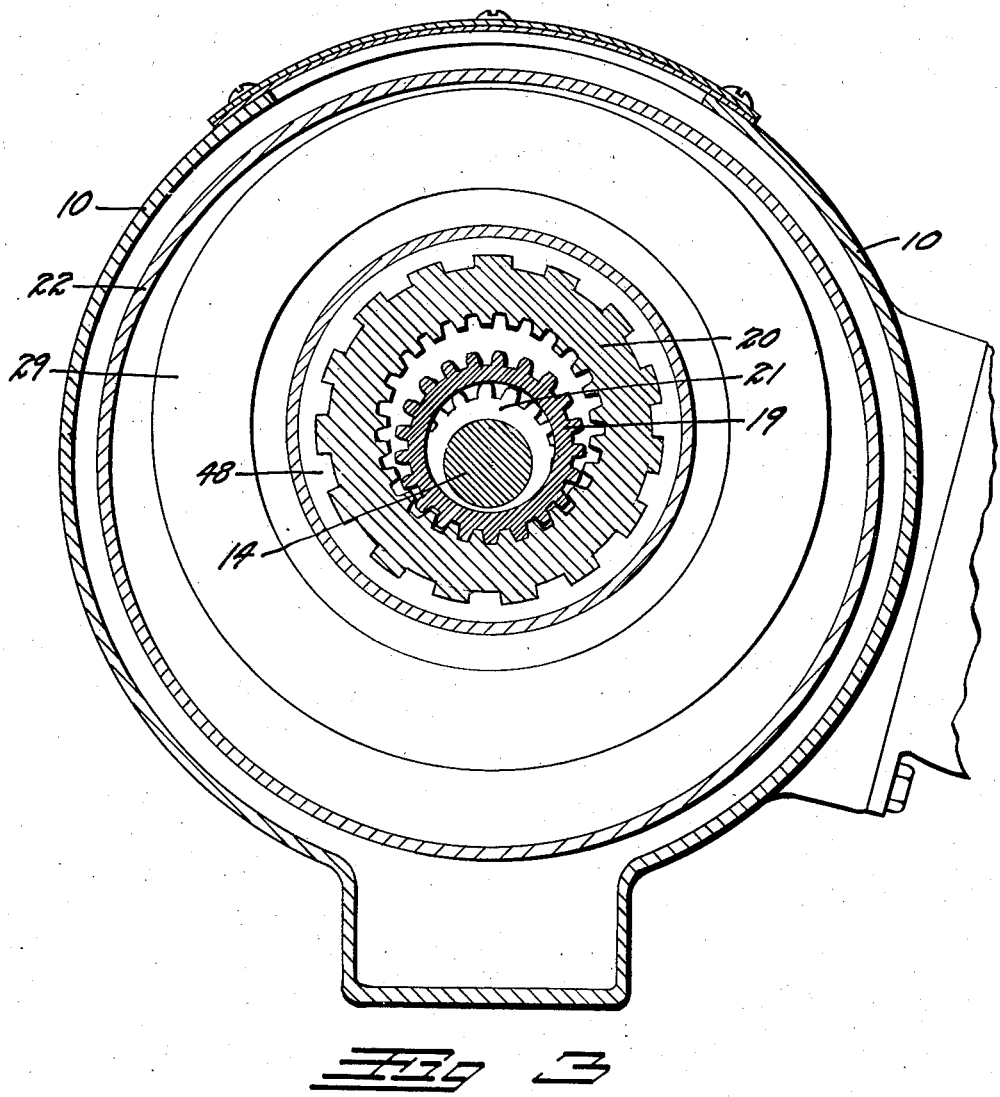

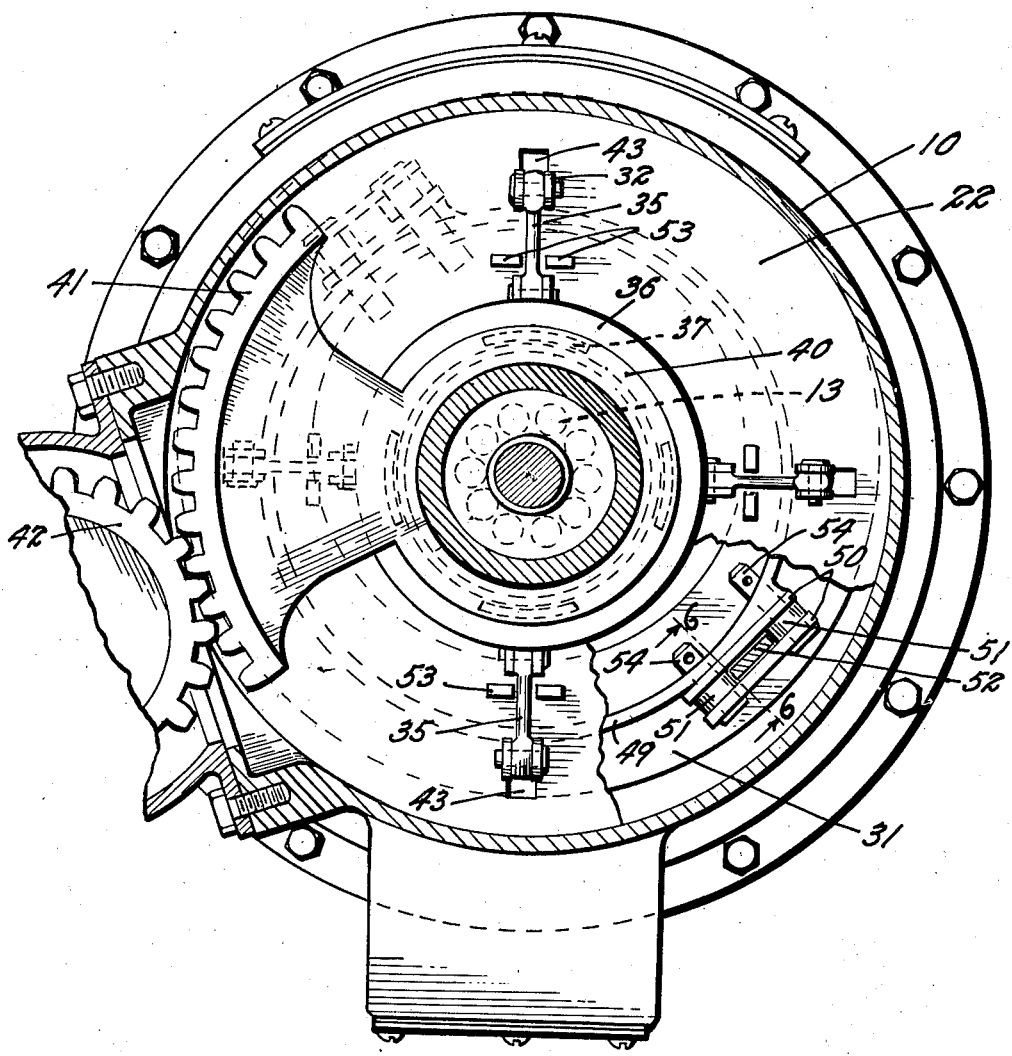

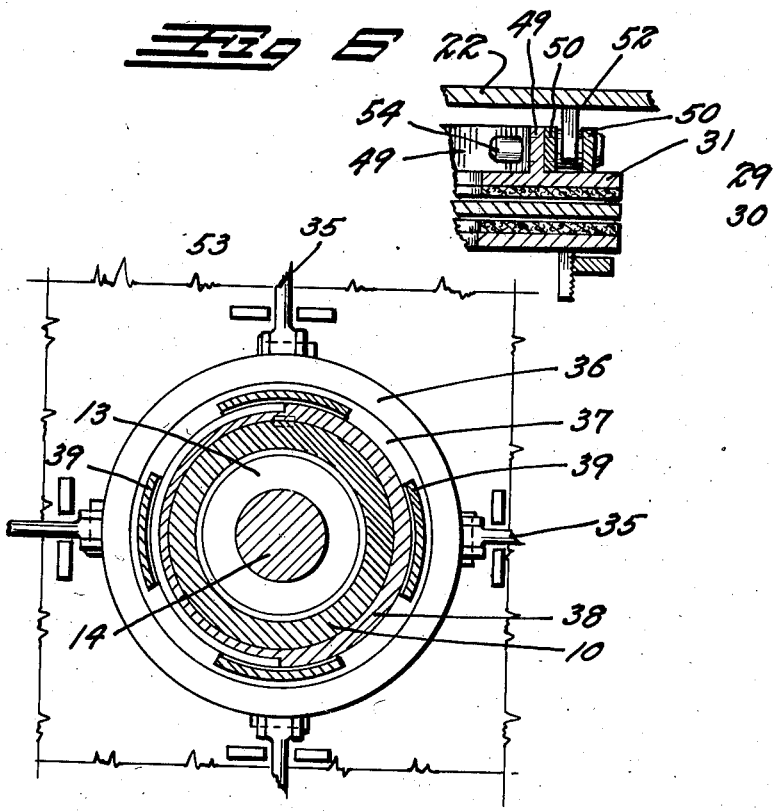

1,953,356

UNITED STATES PATENT OFFICE 1,953,356

AUTOMOTIVE TRANSMISSION

Paul M. Lewis and Elmer H. Bridenbaugh, Denver, Colo., assignors to Lewis American Airways, Inc., a corporation of Colorado Application July 3, 1933, Serial No. 678,774

11 Claims. (Cl. 74—34)

This invention relates to an improvement in power transmission devices, more particularly to a transmission for use on automobiles and other automotive vehicles, such as the transmission as illustrated in applicants' copending application, Serial No. 630,888. The principle of operation in the present transmission is similar to the one described in said copending application.

The principal object of the invention is to provide a transmission device with which an infinite number of gear ratios may be obtained and in which these ratios will follow one another in gradual sequence without intermediate steps or stops.

Another object of the invention is to provide a transmission gear which will eliminate the usual automotive clutch; and which will eliminate all interchangeable meshing of gear teeth.

Still another object is to so construct the transmission that when in the high or 1–1 ratio, there will be no frictional losses due to gear meshing or control mechanisms.

A further object of the present invention is to reduce the frictional speed of the differential braking mechanism from that shown in the said copending application so as to render the said braking mechanism more sensitive and effective.

A still further object is to provide a positive and efficient mechanism for controlling the transmission gear so that the various speed and torque ratios can be minutely and accurately controlled.

The invention is particularly applicable for use in an automotive vehicle, in which, it will eliminate the usual clutch and the usual selective shifting through a series of interchangeable gears. It is not limited to this particular use, however, but will be found valuable wherever it is desired to transmit motion at various speeds with a consequent variation in torque energy, for instance, it could be employed in connection with machine tools such as lathes, boring machines, drill presses, etc., or in hoists and drilling equipment, etc.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical section through the improved transmission mechanism, taken on the line 1—1, Fig. 2.

Fig. 2 is a cross section therethrough taken on line 2—2, Fig. 1.

Fig. 3 is a similar cross section taken on the line 3—3, Fig. 1.

Fig. 4 is a cross section taken on the line 4—4, Fig. 1.

Fig. 5 is a detail section taken on the line 5—5, Fig. 1.

Fig. 6 is a detail section taken on the line 6—6, Fig. 4.

Fig. 7 is a leverage diagram of the gear train illustrating the eccentric relations of the various gears.

Construction

The entire gear mechanism is enclosed in a suitable, fixed gear case, which is preferably formed of several parts for convenience in assembling and which will be designated in its entirety by the numeral 10. This case supports a fixed bearing 11 in which a drive shaft 12 is journalled and a fixed bearing 13 in which a driven shaft 14 is journalled. The shafts 12 and 14 are in axial alignment with each other and, in an automotive vehicle, the shaft 12 would be directly connected to the fly wheel or engine and the shaft 14 would be connected, probably through a suitable reversing mechanism, not shown, with the drive wheels of the vehicle.

The drive shaft 12 terminates in a drive pinion 15 which is constantly in mesh with a relatively large, eccentrically mounted, internal gear 16. A relatively small spur gear 17 is carried concentrically by the internal gear 16. The complete assembly of the gears 16 and 17 will be hereinafter designated as the "first reduction gear 16—17". The spur gear 17 constantly meshes with a second relatively large eccentrically mounted internal gear 18 which also carries concentrically therewith a spur gear 19. The complete assembly of the gears 18 and 19 will be hereinafter designated as the "second reduction gear 18—19".

The spur gear 19 is constantly in mesh with a portion of the width of a relatively wide, eccentrically mounted internal gear, which will be hereinafter designated as the torque gear 20. A driven pinion 21 is constantly in mesh with the remainder of the torque gear 20. The driven pinion 21 is fixed on, and drives the driven shaft 14. This completes the entire gear train from the drive shaft 12 to the driven shaft 14.

All of the gears are mounted in and surrounded by a rotatable housing which will be hereinafter designated in its entirety as the planet housing 22. In actual practice the housing 22 will be formed of a plurality of connected parts as illustrated, for convenience in assembling. The various parts thereof are bolted together by means of suitable cap screws 23.

The planet housing 22 is journaled in the case 10 upon suitable bearings 24 which are concentric with the axis of the shafts 12 and 14. The inner extremity of the driven shaft 14 is supported from the planet housing 22 upon a concentric bearing 25. The first reduction gear 16—17 is journalled eccentrically in the planet housing 22 upon a trunnion bearing 26. The second reduction gear 18—19 is also supported eccentrically in the planet housing 22 in a second trunnion bearing 27. The torque gear 20 is supported eccentrically in the planet housing 22 in a third trunnion bearing 28.

A clutch disc 29 is splined to the periphery of the torque gear 20 as shown at 48 so that it must rotate therewith but may have a limited lateral movement thereon. The disc 29 rotates between two clutch discs 30 and 31 which rotate with the planet housing 22. The clutch discs are preferably, but not necessarily, lined with suitable brake linings as illustrated. Naturally if the clutch discs 29, 30, and 31 are brought into frictional engagement with each other, there will be a tendency to cause the planet housing 22 and the torque gear 20 to be brought to a stationary position with relation to each other. Any suitable means may be employed for bringing the clutch discs into engagement. The means, however, must be so constructed that it can rotate with the planet housing 22.

One method for actuating the clutch discs is to place a series of L-shaped levers 32 through openings 43 in the planet housing 22 so that their shorter extremities 33 may contact with fulcrum bosses 34 on the inner face of the planet housing. The outer extremities of the levers 32 are connected, by means of links 35, to a freely rotatable, internally grooved shifting ring 36. The shifting ring 36 is journalled over a peripheral rib on an annular nut 37 which is threaded upon a stationary threaded sleeve 38. The nut 37 is prevented from rotating with the ring 36 by means of fingers 39 which extend slidably through the nut from a rotatable shifting member 40.

It can be readily seen that if the shifting member 40 be rotated, the fingers 39 will rotate the nut 37 causing it to thread backwardly or forwardly along the threaded sleeve 38. As it moves backwardly or forwardly it will cause the links 35 to rock the levers 32 so as to cause them to pry between the fulcrum bosses 34 and the disc 31 so as to force the three discs toward each other or release them from each other.

The member 40 may be rotated in any desired manner depending upon the particular installation. As illustrated, the member 40 carries a toothed gear segment 41 which is engaged by a spur gear 42. The spur gear 42 may be manually rotated in any desired manner to impart the desired rotation to the ring 40.

The disc 30 is caused to rotate with the housing by means of arcuate fingers 44 which project from the disc 30 through openings 45 in the planet housing 22. The spacing of the clutch disc may be adjusted and the wear between the clutch discs 29, 30 and 31 may be taken up by means of a threaded ring 46 which is threaded over threads upon the fingers 44 and contacts the inner wall of the planet housing 22. Manual rotation of the ring 46 will of course actuate the fingers 46 in or out, thus bringing the clutch discs into any desired adjusted relation. The threaded ring can of course be actuated in any desired manner. For instance, it may be provided with notches 47 in its periphery which may be engaged by a tool inserted through openings in the planet housing 22.

It will be noted that the clutch disc 31 is provided with an annular stiffening rib 49. At opposite positions on this rib, pairs of rollers 51 are carried between guide plates 50. The guide plates 50 and the rollers 51 are secured to the rib 49 by means of suitable pins 54. Lugs 52 are formed on and project inwardly from the inner face of the planet housing 22 between each pair of the rollers 51. The lugs 52 and the rollers 51 transmit the torque between the clutch disc 31 and the planet housing 22. Guide lugs 53 project outwardly from one face of the planet housing 22, at each side of each clutch link 35 (see Fig. 4) so as to assist in transmitting the torque from the planet housing 22 to the shifting ring 36 and prevent straining or bending of the links 35.

OPERATION

Neutral position

In describing the operation we have two types of motion to contend with and in the following description a part moving about its own concentric axis will be said to rotate and a part moving about an axis eccentric with its own will be said to revolve.

Let us assume that the load is holding the driven shaft 14 stationary and that the drive shaft 12 is being rotated forwardly (clockwise when viewed from the driving end) and that the clutch discs 29, 30 and 31 are released from each other. The drive pinion 15 exerts rotative pressure on the first reduction gear 16—17 in a forward direction. The first reduction gear exerts rotative pressure against the second reduction gear 18—19, also in a forward direction. The gear 19 also exerts a forward rotative pressure on the torque gear 20. The torque gear 20 then exerts a forward rotative pressure on the driven gear 21. The torque gear 20, however, can not rotate the driven gear 21 since it is maintained stationary by the stationary shaft 14.

It is now obvious that the gears 16—17, 18—19, and 20 could not rotate in their bearings 26, 27 and 28, respectively, (owing to the locked gear 21) were these bearings fixed in a stationary position. The bearings 26, 27 and 28, however, are mounted in the planet housing 22 which is free to rotate on its bearings 24. Therefor the torque gear in rotating forwardly reacts against the stationary teeth of the driven gear 21 to push or propel itself (the torque gear) rearwardly in its orbit so as to wrap itself around the stationary gear 21. This causes the axis of the torque gear 20 to swing rearwardly about the shaft 14 in the orbit of its eccentricity with relation to this shaft. In order to allow the axis of the torque gear 20 to swing rearwardly, the axis of the bearing 28 must be swung rearwardly. In swinging rearwardly, the bearing 28 must carry the free planet housing 22 rearwardly since the bearing 28 is fixed in the planet housing.

We have a similar reaction between the gears 19 and 20 in which the resistance of the torque gear 20 causes the eccentrically mounted gear 19 to roll backward therein to propel its axis rearwardly. We also have a similar reaction between the gears 17 and 18 in which the resistance of the gear 18 causes the eccentrically mounted gear 19 to roll backward in the gear 18 to propel its axis rearwardly.

Thus all rotative effort of all the gears is absorbed or neutralized by the rearwardly rotating planet housing 22 as long as the clutch discs remain disengaged and the driven shaft is under load. All gears except 21 are rotating forwardly in direct proportion to their ratios and all gears except 15 and 21 are revolving rearwardly about the axes of the shafts 12 and 14. We have now described the "at rest" or neutral position wherein the central clutch disc 29 is being carried forwardly by the forward rotation of the torque gear 20 while the outer clutch discs 30 and 31 are being carried rearwardly by the rearward rotation of the planet housing 22 and no power is being transmitted to the shaft 14. Owing to the great reduction through the gear train, the forward rotation of torque gear 20 is very slow, as is the rearward rotation of the planet housing, therefore the differential rotation between the clutch discs is low and therefore favorable to efficient clutch action.

*An intermediate position*

Let us now assume that the shifting member 40 is actuated so as to bring a slight pressure to bear between the plates 29, 30 and 31. Remember now that the plate 29 is moving forwardly (although it is revolving rearwardly in its orbit) whereas the plates 30 and 31 are moving rearwardly. The frictional engagement now being brought to bear between these plates tends to urge all of them to move in a common direction and since the leverages are in favor of the disc 29 the latter will resist the rearward rotation of the discs 30 and 31 and lend to urge them forwardly. Of course, in passing from a reverse direction of rotation to a forward direction of rotation, the planet housing 22 must pass through a static condition in which it is at rest with the relation to the outer case 10. This is a very transient condition but for the sake of describing an intermediate position we will assume that just sufficient friction has been brought to bear between the clutch plates to bring the planet housing 22 to a stationary position and not to carry it forwardly.

The power is now being transmitted from the drive shaft 12 and gear 15 forwardly through the first reduction 16—17 to the second reduction 18—19, thence forwardly through the torque gear 20 from the gear 19 to the driven gear 21 so that the shaft 14 will rotate forwardly at a speed slower than the shaft 12 in direct proportion to the ratios between the various gears in the train. The torque gear now has a forward rotation but no revolution in its orbit.

*Passing to direct drive or high*

Now let us assume that the clutch discs are brought into still greater frictional engagement. This causes the planet housing 22 to pick up speed in a forward direction from the torque gear 20 through the disc 29. This of course carries the eccentric bearings 26, 27 and 28 forwardly about the axis of the driven gear 21 and causes the torque gear to revolve orbitually forward whereas before from the neutral to the above described "intermedite position", it was revolving orbitually rearwardly. It has always been rotating forwardly so that now the increasing forward orbital revolution is being added to its forward speed of rotation and the sum of these speeds, is being transmitted to the driven gear 21. Thus the speed of rotation of the shaft 14 will be constantly increasing until a point is reached when the clutch discs 29, 30 and 31 will rotate in unison and there will be no relative rotation between the torque gear 20 and the planet housing 22. All of the internal gears are now locked with reference to the planet housing and rotate as a fixed unit therewith. The only bearings that are now operating are the bearings 11, 24, 13 and 25. There is no gear action whatsoever and the shaft 12 is directly connected to the driven shaft 14.

We have now described the "neutral" or at rest position; the "direct drive" position, or high; and an "intermediate position" in which the straight "built in" gear ratio was transmitted. The device, however, is capable of an infinite number of ratios both below and above the "built-in" ratio. Those below the "built in" ratio are accomplished as follows:

In the neutral or at rest position the planet housing 22 is rotating rearwardly at its maximum, whereas the torque gear 20 is rotating forwardly. At the time of the "built in" ratio transmission the planet housing is standing still so that no rotative effort is being subtracted. It can be readily seen that when the planet housing is moving rearwardly its maximum rearward speed, all rotative effort is being subtracted from the driven gear 21. Any exertion of the clutch discs which tends to retard the maximum rearward rotation must add this difference in rotation to the driven gear 21 until the planet housing reaches a stationary position, when the built-in ratio is transmitted.

The ratios above the "built-in" ratio result from the forward rotation of the planet housing. As the planet housing starts to rotate forwardly it adds its forward rotation to the forward rotation of the torque gear 20, causing the sum of these rotations to be imparted to the driven gear 21 until the latter has been brought up to the speed of the shaft 12.

It is desired to call especial attention to the fact that the gear centers or axes together with gear ratios are so related that but a slight differential leverage action is obtained between the clutch discs. Therefore these discs have but a small per cent of turning or torque energy to take care of at any time. This low torque absorption makes it mechanically practical to operate at any intermediate speed (with the clutch discs in sliding contact) over long periods of time without undue heating of clutch plates or without causing appreciable wear thereon.

It is also desired to call attention to the fact that the braking energy of the engaging clutch discs is not absorbed in heat as it would were the discs 30 and 31 stationarily mounted. These discs however are carried by the planet housing so that any energy they subtract from the disc 29 is immediately employed in rotating the planet housing 22.

While a specific form of the improvement has been described and illustrated herein, it is desired to be understood that the same may be varied, within the scope of the appended claims, without departing from the spirit of the invention.

Having thus described the invention, what is claimed and desired to be secured by Letters Patent is:—

1. A variable ratio gear transmission device comprising: a driving gear receiving the incoming power; a driven gear delivering the outgoing being offset from each other; an eccentrically mounted torque gear in constant mesh with both said driving and driven gears; a housing mounted for rotation about the axis of said driven gear; a first eccentric bearing in said housing for said torque gear; a second eccentric bearing in said housing for said driving gear; and means for controlling the differential movement between said torque gear and said housing.

2. A variable ratio gear transmission device comprising: an external driving gear; an external driven gear, the axes of said driving and driven gears being offset from each other; an eccentrically mounted internal torque gear surrounding and in constant mesh with both said driving and driven gears; a housing mounted for rotation about the axis of said driven gear; a first eccentric bearing in said housing for said torque gear; a second eccentric bearing in said housing for said driving gear; and means for controlling the differential movement between said torque gear and said housing.

3. A variable ratio gear transmission device comprising: an external driving gear; an external driven gear, the axes of said driving and driven gears being offset from each other; an eccentrically mounted internal torque gear surrounding and in constant mesh with both said driving and driven gears; a second internal gear secured to and rotating concentrically with said driving gear; a third eccentrically mounted external gear in constant mesh with said second internal gear; a housing mounted for rotation about the axis of said driven gear; a first eccentric bearing in said housing for said torque gear; a second eccentric common bearing in said housing for said driving gear and said second internal gear; a third eccentric bearing in said housing for said third external gear; means for transmitting power to said third external gear; and means for controlling the differential movement between said torque gear and said housing.

4. A variable ratio gear transmission device comprising: an external driving gear; an external driven gear, the axes of said driving and driven gears being offset from each other; an eccentrically mounted internal torque gear surrounding and in constant mesh with both said driving and driven gears; a second internal gear secured to and rotating concentrically with said driving gear; a third eccentrically mounted external gear in constant mesh with said second internal gear; a third internal gear secured to and rotating concentrically with said third external gear; an external power gear in constant mesh with said third internal gear, the axis of said power gear being in alignment with the axis of said driven gear; a housing mounted for rotation about the axis of said power and driven gears; a housing mounted for rotation about the axis of said driven gear; a first eccentric bearing in said housing for said torque gear; a second eccentric common bearing in said housing for said driving gear and said second internal gear; a third eccentric common bearing in said housing for said third external gear and said third internal gear; a concentric bearing between said housing and said power gear; and means for controlling the differential rotation between said torque gear and said housing.

5. A variable ratio gear transmission device comprising: an external driving gear; an external driven gear, the axes of said driving and driven gears being offset from each other; an eccentrically mounted internal torque gear surrounding and in constant mesh with both said driving and driven gears; a housing mounted for rotation about the axis of said driven gear; a first eccentric bearing in said housing for said torque gear; a second eccentric bearing in said housing for said driving gear; a clutch member rotating with said torque gear; a second clutch member rotating with said housing; and means for bringing said clutch members into engagement so as to control the differential movement between said torque gear and said housing.

6. A variable ratio gear transmission device comprising: an external driving gear; an external driven gear, the axes of said driving and driven gears being offset from each other; an eccentrically mounted internal torque gear surrounding and in constant mesh with both said driving and driven gears; a housing mounted for rotation about the axis of said driven gear; a first eccentric bearing in said housing for said torque gear; a second eccentric bearing in said housing for said driving gear; a clutch member rotating with said torque gear; a second clutch member rotating with said housing; levers operatively connected to said second clutch member and rotating with said housing; a shifting ring mounted concentrically with said housing and connecting all said levers; and means for moving said ring toward or away from said housing to cause said levers to bring said clutch members into engagement so as to control the differential movement between said torque gear and said housing.

7. A variable ratio gear transmission comprising: a gear case; a driven shaft journalled in said gear case; a driven gear carried by said driven shaft within said case; a drive shaft journalled in said gear case in alignment with said driven shaft; a drive gear mounted on said drive shaft within said case; a housing journalled in said case concentrically with said drive and driven shafts; a driving gear positioned opposite said driven gear but eccentric thereof; means for transmitting power from said drive gear to said driving gear at reduced speed; a hollow annular, eccentrically-mounted, internally-toothed torque gear surrounding, and constantly in mesh with, both said driving and said driven gears; an eccentric bearing in said housing for said torque gear; and means for controlling the differential speeds between the said torque gear and the said housing.

8. A variable ratio gear transmission comprising: a gear case; a driven shaft journalled in said gear case; a driven gear carried by said driven shaft within said case; a drive shaft journalled in said gear case in alignment with said driven shaft; a drive gear mounted on said drive shaft within said case; a housing journalled in said case concentrically with said drive and driven shafts; a driving gear positioned opposite said driven gear but eccentric thereof; means for transmitting power from said drive gear to said driving gear at reduced speed; a hollow, annular, eccentrically-mounted, internally-toothed torque gear surrounding, and constantly in mesh with, both said driving and said driven gears; an eccentric bearing in said housing for said torque gear; a first clutch disc surrounding said torque gear and rotated thereby; a second clutch disc adjacent said first clutch disc; means for causing said second clutch disc to rotate with said housing; and means for bringing said discs into engagement so as to control the differential movement between said torque gear and said housing.

9. A variable ratio gear transmission comprising: a gear case; a driven shaft journalled in said gear case; a driven gear carried by said driven shaft within said case; a drive shaft journalled in said gear case in alignment with said driven shaft; a drive gear mounted on said drive shaft within said case; a housing journalled in said case concentrically with said drive and driven shafts; a first reduction member; a second reduction member, each of said reduction members consisting of a relatively small external gear concentrically joined to a relatively large internal gear, the internal gear of the first reduction member being constantly in mesh with said drive gear, the internal gear of the second reduction member being constantly in mesh with the external gear of the first reduction, the external gear of the second reduction being positioned opposite to but eccentric from said driven gear; an internal, eccentrically-mounted torque gear surrounding and in constant mesh with both the external gear of the second reduction and said driven gear; eccentric bearings in said housing for said reduction members and said torque gear; and means for controlling the differential speed between said torque gear and said housing.

10. A variable ratio gear transmission device comprising: a driving gear receiving the incoming power; a driven gear delivering the outgoing power, the axes of said driving and driven gears being offset from each other; an eccentrically mounted torque gear in constant mesh with both said driving and driven gears; a housing mounted for rotation about the axis of said driven gear; a first eccentric bearing in said housing for said torque gear; a second eccentric bearing in said housing for said driving gear; and means for locking said torque gear to said housing when desired.

11. A variable ratio gear transmission device comprising: an external driving gear, an external driven gear, the axes of said driving and driven gears being offset from each other; an eccentrically mounted internal torque gear surrounding and in constant mesh with both said driving and driven gears; a second internal gear secured to and rotating concentrically with said driving gear; a third external gear in constant mesh with said second internal gear; a housing mounted for rotation about the axis of said driven gear; a first eccentric bearing in said housing for said torque gear; a second eccentric common bearing in said housing for said driving gear and said second internal gear; a third eccentric bearing in said housing for said third external gear; means for transmitting power to said third external gear; and means for controlling the differential movement between said torque gear and said housing.

PAUL M. LEWIS.
ELMER H. BRIDENBAUGH.